(12) United States Patent
Froehlich et al.

(10) Patent No.: US 8,850,268 B2
(45) Date of Patent: Sep. 30, 2014

(54) ANALYSIS OF SYSTEM TEST PROCEDURES FOR TESTING A MODULAR SYSTEM

(75) Inventors: Stephan Froehlich, Aschheim (DE); Jan Schormann, München (DE); Joern Simon, Feldkirchen (DE); Valentin Elefteriu, Kirchheim (DE); Alexander Urban, Forstinning (DE)

(73) Assignee: Brainlab AG, Feldkirchen (DE)

( * ) Notice: Subject to any disclaimer, the term of this patent is extended or adjusted under 35 U.S.C. 154(b) by 315 days.

(21) Appl. No.: 13/303,207

(22) Filed: Nov. 23, 2011

(65) Prior Publication Data

US 2013/0132777 A1    May 23, 2013

(51) Int. Cl.
*G06F 11/00* (2006.01)
*G06F 11/36* (2006.01)

(52) U.S. Cl.
CPC .................. *G06F 11/3688* (2013.01)
USPC ............... 714/37; 714/25; 714/38.1; 717/124

(58) Field of Classification Search
USPC .............. 714/25, 26, 37, 38.1, 39, 40, 45, 46, 714/47.1; 717/120, 124, 127, 131, 132
See application file for complete search history.

(56) References Cited

U.S. PATENT DOCUMENTS

| | | | |
|---|---|---|---|
| 7,490,319 B2 | 2/2009 | Blackwell et al. | |
| 7,533,369 B2 | 5/2009 | Sundararajan et al. | |
| 8,276,123 B1 * | 9/2012 | Deng et al. | 714/37 |
| 2004/0049365 A1 * | 3/2004 | Keller et al. | 702/186 |
| 2006/0271393 A1 | 11/2006 | Lopez et al. | |
| 2008/0115114 A1 | 5/2008 | Palaparthi et al. | |
| 2009/0094061 A1 | 4/2009 | Kelly et al. | |
| 2009/0150724 A1 * | 6/2009 | Pramidi et al. | 714/37 |
| 2010/0138812 A1 * | 6/2010 | Narayanan et al. | 717/131 |

* cited by examiner

*Primary Examiner* — Joseph D Manoskey
(74) *Attorney, Agent, or Firm* — Tucker Ellis, LLP

(57) ABSTRACT

The present invention relates to a method of determining an analyzing level for analyzing a system test procedure for testing a modular system having functional modules, comprising acquiring dependency data comprising dependency information describing at least one functional dependency of at least one functional module, acquiring change data comprising change information describing a change in a module test procedure for testing at least part of the at least one functional module located at a first system test level, acquiring impact data comprising impact information describing an impact of the change in the module test procedure on testing a functionality of the at least one functional module based on the dependency information and the change information, determining, based on the impact information, analyzing level data comprising analyzing level information describing an analyzing level being the system test level at which the system test procedure is analyzed.

26 Claims, 8 Drawing Sheets

| ID | Module | Change | First change | Relation | | |
|---|---|---|---|---|---|---|
| - | - | - | - | Module | Parent | Child |
| M 1.0 | M 1.0 | C 1 | C 1 | M 1.0 | M 1.0 | E 1 |
| E 1 | M 1.0 | C 1 | C 1 | M 1.0 | E 1 | E 1.1 |
| E 1.1 | M 1.0 | C 5 | C 1 | M 1.0 | E 1 | E 1.2 |
| E 1.2 | M 1.0 | C 1 | C 1 | M 1.0 | M 1.0 | E 2 |
| . | . | . | . | . | . | . |
| . | . | . | . | . | . | . |
| . | . | . | . | . | . | . |
| E 1.1 | M 2.0 | C 5 | C 5 | M 2.2 | M 2.2 | E 1 |
| . | . | . | . | . | . | . |
| . | . | . | . | . | . | . |
| . | . | . | . | . | . | . |

ANALYSIS OF SYSTEM TEST PROCEDURES FOR TESTING A MODULAR SYSTEM

FIELD OF THE INVENTION

The present invention is directed to a method of determining an analyzing level for analyzing a system test procedure for testing a modular system, and is directed to a system, in particular digital data processing system, for tracking changes in such a system test procedure.

BACKGROUND OF THE INVENTION

In many fields of technology, in particular fields in which use of specific technical devices is regulated by law, it is necessary to create complex documentation comprising information about the conditions to which the respective technical device has been tested. Only with such documentation, compliance with legal provisions for selling and using the device is possible. However, the device to be tested may often be described as a system having a complex and detailed structure comprising a number of components. Testing the whole system for example as to operational safety often appears to be complicated and cumbersome, in particular in the event that a new test is necessitated by changing only part of the system or a test procedure.

US 2009/0094061 A1 discloses to generate medical documentation sets by replicating a predetermined medical template and associating a unique medical label with the medical documentation in order to meet statutory requirements. The aim of this publication is to electronically document medical care performed on a specific patient.

US 2006/0271393 A1 discloses a computer system for rapid design of multiple component products, especially medical products, comprising a qualification and validation processing and an audit processing which are designed to meet the requirements mandated by the US food and drug administration (FDA). The system is configured to take into account information provided by a customer.

US 2008/0115114 A1 teaches to discover the functional aspects of a piece of software code using a system which includes a unit testing application which is designed to automate the unit testing of the subject software code. The system is configured to generate reports about the testing, which merely comprise information about a testing result but do not include any information about the testing procedure itself.

U.S. Pat. No. 7,533,369 B2 discloses a system and method for generating software documentation having a testing module which includes an automated documentation generation module. The system and method are configured to automatically generate documentation and user training materials following any changes applied to the software during development.

U.S. Pat. No. 7,490,319 B2 discloses a testing tool for testing of complex software systems having a plurality of interrelated system components and a suite of test scenarios for testing the performance of the plurality of interrelated system components. The testing tool includes a means for executing all or a subset of the test scenarios associated with the interrelated system components, and a means for evaluating the results of the executed test scenarios. The aim of that disclosure also is to enable auditing of changes, in particular generating documentation, and to ensure compliance with internal or regulatory requirements. A graphical display is provided for displaying parent-child relationships between individual test cases at a plurality of levels and for indicating which test cases or software module may be affected by changes in a single test case or software module. It, however, appears that the entire software system is re-tested after one or more of its modules has been changed.

SUMMARY OF THE INVENTION

A problem to be solved by the invention thus is to increase the efficiency of testing a modular system after changing part of the system and/or part of a testing procedure for testing the system.

This problem is solved by the subject-matter of any appended independent claim. Advantages, advantageous features, advantageous embodiments and advantageous aspects of the present invention are disclosed in the following and contained in the subject-matter of the dependent claims. Different advantageous features can be combined in accordance with the invention as long as technically sensible and feasible. In particular, a feature of one embodiment which has the same or similar function of another feature of another embodiment can be exchanged. In particular, a feature of one embodiment which supplements a further function to another embodiment can be added to the other embodiment.

Preferably, the inventive method is a method of determining an analyzing level for analyzing a system test procedure. The inventive method preferably takes the form of a data processing method which is in particular executed by or on a computer. The system test procedure preferably comprises or consists of a method comprising predefined steps. The predefined steps are used to test a product being or representing a modular system, in particular a hardware product such as any kind of apparatus or a software product, as to whether it is operationally safe and/or complies with regulatory requirements. More generally, testing an apparatus encompasses visual checks of the apparatus as to its physical integrity, its packaging and labelling and alternatively or additionally operational tests of the apparatus, i.e. putting the apparatus to use or executing at least specific functions of the apparatus. For example, the apparatus to be tested may be an X-ray device. In this case, the device has to be checked in particular as to whether its electric connections are safe to operate, whether the beam energy control works correctly and whether all necessary safety notices have been applied to the device. More generally, the device has to be checked whether it fulfils the predefined conditions for all factors which may avoid erroneous functioning or operation of the device, in particular for all factors which may cause harm to a human being. The apparatus may also be any other kind of apparatus which is not limited to medical use, such as a mechanical tool (e.g. a screwdriver suitable for general applications) or an electric motor for driving a vehicle. In the case of the modular system being a software product such as an executable application or a script, testing the modular system may encompass testing code integrity and reliability of data transfer operations, in particular reading and/or writing operations. Further, tests as to accuracy or reliability of data which is output by the software product may be performed (for example by test runs of the application). The software product may be designed to process medical data, in particular medical image data such as digital data acquired by a medical imaging device, in particular an X-ray or (nuclear) magnetic resonance device. Alternatively or additionally, the software product may be designed to control such a medical imaging device. However, the software product may be any other kind of software product for other purposes such as for example an operating system for a computer or an email client application. In other words, the modular system has to be checked for operability, in particular for correct functioning or malfunctions, in particular health risks and/or technical risks which may arise from operating and changing of the modular system.

The system test procedure is preferably designed in consideration of risks which are connected with the apparatus and the requirements (in particular, product requirements) imposed by for example designated use of the apparatus. In order to reduce, in particular minimize, the risks, certain measures (so-called risk-decreasing measures) are taken within the system test procedure. In order to fulfil the requirements, the apparatus is designed according to a specification which in particular includes technical information about the apparatus. The requirements are preferably defined by the manufacturer of the apparatus. Furthermore, a test plan is generated which is in terms of this invention embodied by the system test procedure as described above.

Preferably, test documentation is finally created which in particular lists the steps of testing which have been performed or not performed by conducting the system test procedure with regard to the apparatus and preferably identifies the results of individual steps and the overall system test procedure. Such test documentation is in general required by statutory regulations in that it is a prerequisite for officially allowing sale and/or use of the apparatus to document measures taken against risks which have been identified by the manufacturer.

The invention in particular is directed to a combination of identifying the risks in order to take risk-decreasing measures, defining the requirements in order to define a technical specification for the apparatus and defining the test plan, in particular in order to create the required test documentation. More particularly, the risk-decreasing measures and the product requirements are combined in order to create the test plan. In particular, it has to be ensured that the risk-decreasing measures do not impair the suitability of the product to fulfil the product requirements. In other words, the test plan is preferably created based on information about said necessity for introducing risk-decreasing measures and about the product requirements.

Preferably, the system test procedure is used for testing a modular system having functional modules. The modular system may be embodied by the above-defined apparatus which is tested. Preferably, the modular system is a medical device or any other device, the use of and selling of which in particular being governed by statutory regulations or general technical safety regulations, in particular technical standards. In particular, the modular system comprises or consists of functional modules which are in particular constituents of the modular system which function as an operational unit of their own. In the case of an apparatus as the modular system, the functional modules may be represented by for example a power source (as a first functional module) and a motor (as a second functional module) driven by the power source. In the case of a software product, the functional modules may be represented by for example software modules which have been created according to the principle of modular programming, for example a first functional module being an executable application and second functional module being a script called by the executable application. According to on embodiment of the invention, the modular system comprises only one functional module which shall be tested as to its correct operation. In another, more preferred embodiment, a plurality of functional modules, in particular at least two functional modules interact or operate in conjunction with one another in order to produce or support a predetermined functionality which is equal to or forms part of the functionality of the modular system. In other words, the functional modules are operationally interrelated. For example, a functional module may be designed to perform a specific calculation and to output the corresponding result which may then be read and processed by a second, in particular different functional module. Alternatively or additionally, a first functional module may be designed to control a power supply unit which is part of a second, different functional module. In particular, a specific functional module may be comprised in different modular systems and may be designed to function in operation or conjunction with different sets of other functional modules, depending on the type of functional modules which are required for supporting or achieving the functionality of the respective modular system. A functional module may comprise one or more functional sub-modules which in turn support or achieve the functionality of the functional module. In this manner, the hierarchy of functional modules may be continued in that a module on each level of functionality may again comprise one or more modules of a lower level of functionality. The entirety of functional modules, and, if applicable, their functional sub-modules, then make up the modular system. The modular system and the functional modules and the functional sub-modules are in the following also generally referred to as functional units. A functional module may be called a functional sub-module if it forms part of another functional module, in particular if it (i.e. its functionality) is completely part of such another functional module. However, in order for a functional module to be dependent on another module, it need not be dependent on one of its own sub-modules, but may also depend from another functional module which preferably is located at a lower level of functionality. The level of functionality is preferably defined by a lower level of functionality not providing all features of functionality which are provided at a higher level of functionality. For example, a functional module located at a higher level of functionality may be considered to provide more or more complete functions than a functional module located at a lower level of functionality.

Where in the framework of this disclosure information is acquired or determined, such information is preferably acquired as data comprising the information. Such data then is called by the name of the information or information content, respectively, for example dependency data comprises dependency information. In general, XY data comprises XY information, where XY is the name of the information which is in general chosen according to the information content, i.e. according to what the information describes. Information is in the framework of this disclosure preferably embodied by the information content of digital data.

Preferably, dependency information about at least one functional dependency of at least one functional module, preferably a plurality of, more particularly two or more functional modules and/or functional sub-modules, on itself or one another, respectively, is acquired. In the case of only one functional module being present in the modular system, the dependency information in particular describes the way in which the only one functional module is designed to operate, for example the order of execution of program steps or the manner of transfer of input and/or output data between parts of a program. In such a case, the only one functional module may be said to be functionally dependent on itself. In the case of at least two functional modules being present in the modular system, the term of functional dependency in particular encompasses the way that the at least two functional modules interact with one another or the fact whether one functional module requires the functionality of another functional module in order to operate as envisaged.

In the above example, a second functional module may require the output which is delivered by the first functional module in order to carry on with the data processing. Therefore, the second functional module is functionally dependent on the first functional module.

In particular, the term of functional dependency (in the context of this invention also simply called "dependency", the term of being dependent or of depending therefore having the same meaning as functionally dependent or functionally depending, respectively) encompasses the case in which one functional module has to be functionally dependent on another functional module in order to fulfil the risk-decreasing measures and/or the product requirements.

The dependency information in particular describes the relationship between the functionality of the modular system and at least one functional module and/or the dependency of the functionality of one functional module on the functional module of at least one other functional module or functional sub-module. The dependency information may describe the functional dependency as a parent-child relationship in the sense that the functional unit which depends on the functionality in another functional unit is the child, the other functional unit being the parent. A graphical display of the functional dependencies of the entirety of functional units which make up the modular system may therefore take a tree-like or net-like structure. A tree-like structure occurs in particular in the event that one child depends on only one parent for each functional unit. A net-like structure occurs in particular in the event that one child depends on two ore more parents, wherein the parents in turn depend on one another. The structure of dependencies among functional units is preferably visualised by using a graphical user interface (GUI) as either a tree-diagram or a net diagram in which dependencies between functional units are preferably displayed as a connecting line which connects the functional units which depend on one another. Preferably, also the direction of dependency is visualised, for example by an arrow pointing in the direction of dependency. Alternatively, the dependency may be displayed in a manner indicating that the direction of dependency is not indicated, for example in cases in which such information is not necessary as long as it is indicated that some kind of dependency exists. In particular, the display may indicate that the direction is not limited to one direction, for example a double arrow between functional modules may indicate that the functional modules connected by the double arrow depend on one another reciprocally.

Preferably, change information about a change in a module test procedure for testing at least part of a first functional module located at a first system test level is acquired. The module test procedure for testing at least part of the first functional module preferably is part of the system test procedure for testing the modular system. In particular, the module test procedure is executed as a part of the system test procedure. Alternatively or additionally, the module test procedure may also be executed individually and independently of the system test procedures. The module test procedure is preferably configured to execute steps which allow to determine whether a functional module functions correctly (e.g. as envisaged in view of its intended use or purpose) and is checked whether it fulfils any predefined conditions leading to erroneous functioning or operation of the module, in particular whether operation of the module may cause harm to a human being or bears a technical risk. A technical risk is understood to encompass a danger arising from malfunction of the modular system and/or a functional module. For example, a risk of break-out of fire or electric shock is considered to be a technical risk. However, a health risk may also relate to a risk type in its own right if it e.g. encompasses a biohazard and need not be necessarily associated with a malfunction of the modular system but rather be a consequence of side-effects of proper functioning. If a technical risk leads to endangering a human being, the technical risk also encompasses a health risk. A health risk may therefore be encompassed by the term of technical risk. The first functional module to be at least partly tested by the module test procedure is preferably located at a first system test level. The term of system test level encompasses in particular the level of functionality at which a system test is to be run or is run. This in particular means that a system is tested for its functionality and/or operability starting at the system test level which preferably corresponds to testing a specific functional level and all higher-order functional levels which are in particular located above that system test level (which therefore corresponds to the analyzing level mentioned below). In particular, all functional levels located below this system test level are not to be tested or are not tested by the module test procedure for testing at least part of the first functional module.

The change in the module test procedure preferably encompasses altering a step of the module test procedure, removing a step from the module test procedure or adding a step to the module test procedure. The change in the module test procedure in particular comprises amending a digital or hard copy specification which describes (specifies) the module test procedure. Specifically, a change to the module test procedure may take the form of a text amendment, i.e. adding, deleting or altering text information comprised in the specification. The change information may in this case be determined by a string comparison as known in the prior art. The text information may be embodied in a digital version of the specification, for example a machine-readable format such as a PDF, TXT, HTML (or other mark-up language) or other text document data format. The text information may, however, also be present as a hard copy of the specification such as a human-readable or machine-readable printout. In case of a human-readable printout, the text information is preferably printed in characters (i.e., letters comprising the alphabet and numbers as well as special characters such as a comma or underscore). In such a case, preferably only the changed text parts are saved along with change metadata comprising change meta-information which indicates the location at which for example added text has to be inserted into the original text and if or which parts of the original text has to be removed in order to generate the changed version of the module test procedure. In case of a machine-readable specification, the text information may be encrypted in for example a barcode or other graphical representation other than characters. In the latter case, the change in the module test procedure may also be embodied as a graphical change to the barcode or other graphical representation. The change information preferably comprises information about the kind of change and in particular about the module test procedure before being changed and after being changed. More particularly, the change information also comprises a mapping between the steps of the module test procedure before and after being changed.

According to one embodiment, the complete changed version of the module test procedure may be saved, i.e. stored to a non-volatile digital memory. Preferably, only the changes to the module test procedure are saved, preferably together with change metadata comprising change meta-information for preferably each change which indicates at which location the module test procedure has been changed or which part thereof has been changed. Such a procedure avoids unnecessary consumption of storage space since not the complete, potentially longer changed version (i.e. a changed version consisting of a potentially larger amount of digital data than the original version does) of the system test procedure is saved. The change meta-information in particular describes a relationship between the module test procedure and the changes, in particular how the changes fit into the original module test procedure. In other words, preferably only differences between versions of the module test procedure are saved. Since also the at least one functional dependency may be changed (for example by introducing a new module between two previously existent modules), the change information may also comprise information about a change in the at least one functional dependency.

Preferably, impact information about an impact of the change in the module test procedure for testing the first functional module (i.e. the first module test procedure) on testing a functionality of a second functional module is acquired in particular based on the dependency information. In particular, it is determined whether the change in the module test procedure has a specific consequence for testing a functionality of a second functional module, in particular whether it requires a change in a second module test procedure which is configured for testing a second functional module. The second functional module preferably is different from the first functional module. The impact information in particular comprises information about whether the change in the first module test procedure requires a change in the second module test procedure or not. If a change in the second module test procedure is required, the impact information preferably also comprises information about the type and details of the change which is required. The impact information in particular also comprises information about the necessity of testing a second functional module if the first module test procedure is changed. More particularly, a change in the first module test procedure may require a re-testing of a second functional module if the result of the testing the second functional module depends on the way of testing the first functional module. For example, a change in the first module test procedure may lead to a new risk and it has to be determined whether the system test procedure is suitable for reducing or avoiding that new risk. In particular, the new risk may arise from an operational interaction of the first functional module with the second functional module and may therefore require a change in a module test procedure for the second functional module (i.e. a second module test procedure).

The first functional module and the second functional module may be located at the same functional level. However, they may also be located at different functional levels (for example, the second functional module may be located at a higher or lower functional level than the first functional module).

Preferably, the system test procedure is analysed as to coherence and conclusiveness, in particular as to its suitability for testing the modular system and whether the system test procedure and/or documentation about it fulfils the conditions for allowability of use and/or selling of the modular system imposed by statutory regulations. Necessity of such an analysis in particular arises if the change information indicates a change in a module test procedure and/or if the impact information indicates that the change in the module test procedure has an impact on testing a functionality of a second functional module (in particular an impact on a second module test procedure). Analyzing the system test procedure in particular encompasses running of (executing) the system test procedure. Preferably, the system test procedure is analysed starting at a specific system test level which is determined as the analyzing level. In a very preferred embodiment of the invention, the analyzing level is determined based on the impact information. Alternatively or additionally, the analyzing level may be determined based on the change information. In particular, the system test procedure is analysed at all functional levels located at or above the analyzing level. For example, the analyzing level is located at the functional level at which the change in the first module test procedure has occurred. Alternatively or additionally, the analyzing level may be located at the functional level at which a change in the second module test procedure is necessary or has been implemented.

Preferably, a risk-decrease level is determined. The risk-decrease level in particular is a functional level of the modular system at which a risk-decreasing measure has to be implemented for decreasing a risk resulting from the change in the first module test procedure. The risk-decreasing measure for example encompasses a change in another module test procedure. Alternatively or additionally, the risk-decreasing measure encompasses a change in basic design of the modular system.

Preferably, a second module test procedure for testing a second functional module is not executed when the system test procedure is executed if it is determined or known that the first and the second functional module have a predetermined technical relation, i.e. interaction and/or interoperability. In the context of this disclosure, the term of interaction encompasses the case in which the first functional module requires the functionality of the first functional module in order to provide its own functionality; the term of interoperability encompasses the case in which the first and the second functional modules operate in parallel but do not require one another in order to provide their respective functionalities—however, operation of one of the functional modules may influence the operation of the other functional module. In particular, the second module test procedure is not executed although the analyzing level information indicates that the second module test procedure needs to be run if the change information indicates that there has to be a change in the first module test procedure. Re-running the second module test procedure may not be necessary if, for example, it is known or determined that a new risk arising from operation of the second functional module after the change has already been decreased and/or avoided by a risk-decreasing measure which has been implemented for the first functional module in response to the change information indicating a change. For example, the first functional module is a piece of software, in particular software code, and the second functional module is a piece of hardware which is controlled by executing the software code of the first functional module. In this case, the mode of interaction between the first and second functional modules is known. For example, a change in the first functional module may lead to a new risk arising from the second functional module which, however, may only be decreased by implementing a risk-decreasing measure in the software code of the first functional module. If it is determined that such a risk-decreasing measure has been implemented in particular in the first module test procedure, re-execution of the second module test procedure may appear to be not necessary. Thus, such a re-execution may be avoided in this case in order to increase the efficiency of re-testing the modular system after implementing a change in the first module test procedure. In this case, it also does not appear necessary to implement a risk-decreasing measure in the second or a third functional module, the third module functional module being different from the first and second functional modules.

Alternatively or additionally, the analyzing level may be determined based on information about an impact of the change of the first modular test procedure on the technical relation between the first and second functional modules. For example, a change in the first module test procedure may not have an impact on the second module test procedure but rather on a result which is received by a combination of executing the first and second module test procedures and/or operating the first and second functional modules.

Preferably, digital or hard copy documentation containing information about the system test procedure, in particular execution of the system test procedure, is produced. Statutory regulations and/or other legal requirements generally require traceability of changes which are applied to a system test procedure. This purpose is fulfilled by producing the documentation. The documentation in particular comprises information about whether the system test procedure has been executed for the modular system and at which system test level the execution was started. Furthermore, information about omitting a system test level (in particular, in case of a known and/or predetermined technical relation of functional modules) may be added. The documentation preferably also comprises information about any change implemented in the system test procedure or its parts. The documentation preferably also comprises the analyzing level information and/or the impact information and/or the change information. The term of digital documentation encompasses in particular human-readable text files which may take for example a PDF, TXT or HTML (or other mark-up language) or other document format. The digital documentation is preferably saved in a digital data file having the mentioned format. The term of hardcopy documentation encompasses in particular a printout of the digital documentation on paper or any other human-readable or machine-readable print medium. The results of testing may be encrypted in a bar code or other graphical representation as an embodiment of machine-readable documentation.

Preferably, it is determined whether the produced documentation complies with a predetermined standard which in particular is a legal or statutory and/or technical requirement. For example, it is determined whether the documentation fulfils the requirements for consistency of documentation and/or testing steps to be executed.

Preferably, the documentation also lists risk-decreasing measures which have been implemented in response to executing at least part of the inventive method of determining the analyzing level.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. Preferably, the data storage medium is a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

The method in accordance with the invention is in particular a data processing method. The data processing method is preferably performed using technical means such as a digital data processing system, in particular a computer. In particular, the data processing method is executed by or on the computer. The computer in particular comprises a processor and a memory in order to process the data, in particular electronically and/or optically. The calculating steps described are in particular performed by a computer. Determining or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals represent in particular the data received or outputted by the computer.

The expression "acquiring data" or "acquiring information" encompasses in particular (within the framework of a data processing method) the scenario in which the data or information are or is determined by the inventive method, in particular data processing method or program. Determining data in particular encompasses measuring physical quantities and transforming the measured values into in particular digital data and/or computing the data by means of a computer, in particular computing the data within the method of the invention. The meaning of "acquiring data" in particular also encompasses the scenario in which the data are received or retrieved by the data processing method or program, for example from another program, a previous method step or a data storage medium, in particular for further processing by the data processing method or program. Thus, "acquiring data" can also for example mean waiting to receive data and/or receiving the data. The received data can for example be inputted via an interface. "Acquiring data" can also mean that the data processing method or program performs steps in order to (actively) receive or retrieve the data from a data source, for instance a data storage medium (such as for example a ROM, RAM, database, hard disc, etc.) or via the interface (for instance, from another computer or a network). The data can achieve the state of being "ready for use" by performing an additional step before the acquiring step. In accordance with this additional step, the data are generated in order to be acquired. The data are in particular detected or captured (for example, by an analytical device). Alternatively or additionally, the data are inputted in accordance with the additional step, for instance via interfaces. The data generated can in particular be inputted (for instance, into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. Thus, "acquiring data" can also involve controlling or commanding a device to obtain and/or provide the data to be acquired. The acquiring step in particular does not involve an invasive step which would represent a substantial physical interference with the body requiring professional medical expertise to be carried out and entailing a substantial health risk even when carried out with the required professional care and expertise. The acquiring step in particular does not involve a surgical step and in particular does not involve a step of treating a human or animal body using surgery or therapy. This also applies in particular to any steps directed to determining data or information. In order to distinguish the different data used by the present method, the data are denoted (i.e. referred to) as "XY data" and the like and are defined by the information (in this example, "XY information") which they describe.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

The invention also encompasses a digital data processing system for tracking changes in the above-described system test procedure. The digital data processing system preferably comprises a test procedure database, a dependency model unit, a dependency unit presentation unit, a server and a data storage unit. The server preferably is a cloud server but may also be located in a (closed, i.e. non-public) local area network. The digital data is processed by a computer, more particularly an electronic digital processor of computer.

The test procedure database in particular comprises system test procedure test data which in turn comprises system test information about at least part of the system test procedure (e.g. a list of testing steps to be executed). The system test information (e.g. metadata) preferably comprises information about the above-described documentation.

The dependency model unit preferably comprises dependency data which in turn comprises the above-described dependency information.

The dependency model presentation unit is in particular configured to display the at least one functional dependency and preferably comprises the above-mentioned graphical user interface or a graphical display of the dependencies. The graphical user interface preferably allows for allocation or removal of dependencies by user interaction (in particular, by using the pointing instrument such as a computer mouse).

The server is in particular configured to run a surveillance server application which in particular comprises code means for checking the test procedure database for changes in the system test information. The application preferably is contained in an executable file which is run on the server in particular in scanning intervals. If the application determines a change in the system test information, the application preferably executes a step of generating updated documentation. If the application determines that a change in the system test information is being currently implemented or has been implemented at a point in time between the scanning intervals, the system test information as it was before the change (the original system test information) is preferably stored in the data storage unit. The data storage unit may for example be a non-volatile digital memory, e.g. a magnetic permanent memory such as a common hard drive or an optical memory (e.g. a DVD or CD-ROM).

Preferably, the graphical user interface is generated by a graphical user interface unit and offers a possibility for controlling the at least one functional dependency, in particular by adding information (preferably, visual information) about existence or non-existence of dependency between functional modules.

A specific embodiment of the inventive method reads as follows:

A method of determining an analyzing level for analyzing a system test procedure for testing a modular system having functional modules, comprising:
 a) acquiring dependency information about at least one functional dependency of functional modules on one another;
 b) acquiring change information about a change in a module test procedure for testing at least part of a first functional module located at a first system test level;
 c) acquiring impact information about an impact of the change in the module test procedure on testing a functionality of a second functional module based on the dependency information and the change information;
 d) determining, based on the impact information, analyzing level information about an analyzing level being the system test level at which the system test procedure is analyzed.

BRIEF DESCRIPTION OF THE DRAWINGS

In the following, a preferred embodiment of the invention is described, the features of which may be combined with the features of the invention as described above. The preferred embodiment is illustrated by means of the appended figures which are not to be interpreted as restricting the invention but rather as an exemplary description, wherein there is shown in
 FIG. 1 a general flow diagram of requirements engineering.

DETAILED DESCRIPTION

Figure 1:
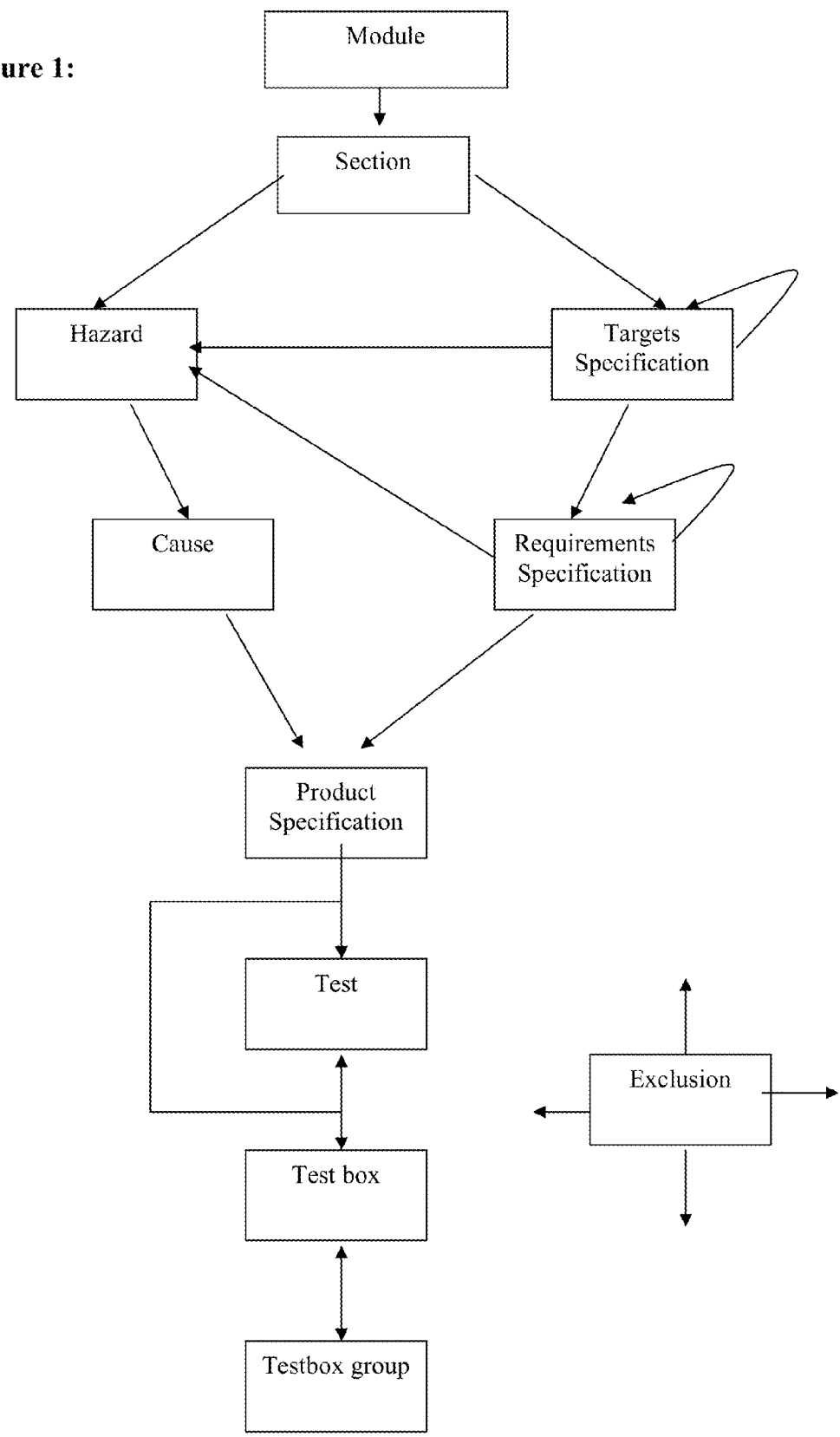

FIG. 1 shows a general flow diagram of requirements engineering and of a risk management process which is applicable to the method of the present invention. In the following, the inventive method is also denoted as a compliant process since the method and system used for implementing the invention preferably complies with applicable norms and regulations, in particular ISO 14971:2007 and the FDA regulations on the development, risk management, and requirements management for medical devices.

As is illustrated by FIG. 1, any kind of sub-product which is called "section" which is at least part of a module (in particular, the at least one functional module which is part of the modular system), which is in particular any kind of hardware or software product, is associated with specific hazards and targets which are specified in a target specification for the product. The targets comprise for example the envisaged used and capabilities of the product. The specification of certain targets may also have an influence on the existence of a specific hazard. Once the hazard has been determined, a cause for the hazard has to be found. Accordingly, requirements, in particular technical requirements, for the product have to be defined in the requirement specification in accordance with the targets to be met by the product. The requirements may again have an influence on the existence of a certain hazard—in other words, specific requirements may cause certain hazards. Once the cause or causes for the hazard and the requirement specification have been determined, a product specification can be defined. The product specification considers both the hazard causes and the requirements for the product and in particular comprises a definition of how to build, in particular how to assemble, the product and/or how to use the product. More specifically, the product specification may define materials of which the product is to be made in the case the product is an apparatus. In case the product is a method, in particular a method embodied by software such as a program, the product specification may define a programming language in which the software is written and which compatibility requirements have to be met for compatibility with other software products, in particular operating systems or specific applications. The targets specification and the requirements specification may be iterated, for example to refine the respective specifications (indicated by the curved arrows leasing back to the respective boxes).

Product features to be tested in the compliance test which appear to be evident (such as for example the colour of an apparatus or graphical output of a software application) may be directly incorporated into the "test" step of the compliance testing. However, this procedure is optional and in general not required. Rather, after determining, in particular finally determining, the product specification, the compliant process enters the step of determining test boxes. A test box is a collection of tests which are preferably executed in a specific association with one another. In particular, the tests contained in a test box are executed coherently in time, i.e. in one test procedure piece without an interruption, in particular without an interruption by another test. According to the invention, it is also possible to execute more than one, in particular a plurality of test boxes in parallel. In the following step, a test box group is determined which comprises grouping of tests, in particular test boxes, into workflows. In particular, determining test groups comprises arranging a plurality of test boxes (i.e. preferably at least two test boxes) to be executed for example in parallel or in serial. A test box group preferably comprises test boxes which are directed to different aspects of the product. For example, one test box group may be directed to testing the contents of a handbook for the product, while another test box is directed to executing a functional test for the product. Alternatively or additionally, different test boxes may be directed to testing application of the product with or to different entities with which the product is to be used or to which the product is to be applied. For example, one test box containing the test box group may be directed to testing a medical device with a specific anatomical region (such as the left knee), whereas another test box contained in the test box group is directed to testing the application of the product to another anatomical region (such as the right knee).

The tests determined and preferably also executed in the steps denoted as "test", "test box", and "test box group" are the above-described tests contained in the module test procedure and/or system test procedure according to the invention.

Throughout the compliance test (i.e. the steps following determination of the product specification), one or more steps denoted "exclusion" is or are executed for each of the steps of the compliance test. The exclusion step preferably comprises exclusion of specific risks from a specific test depending on the context in which the test is executed. Therefore, the exclusion is context-specific. This encompasses non-testing of the product with regard to the specific risks which may not arise in a specific use context of the product which is being tested in a specific test.

Figure 2:
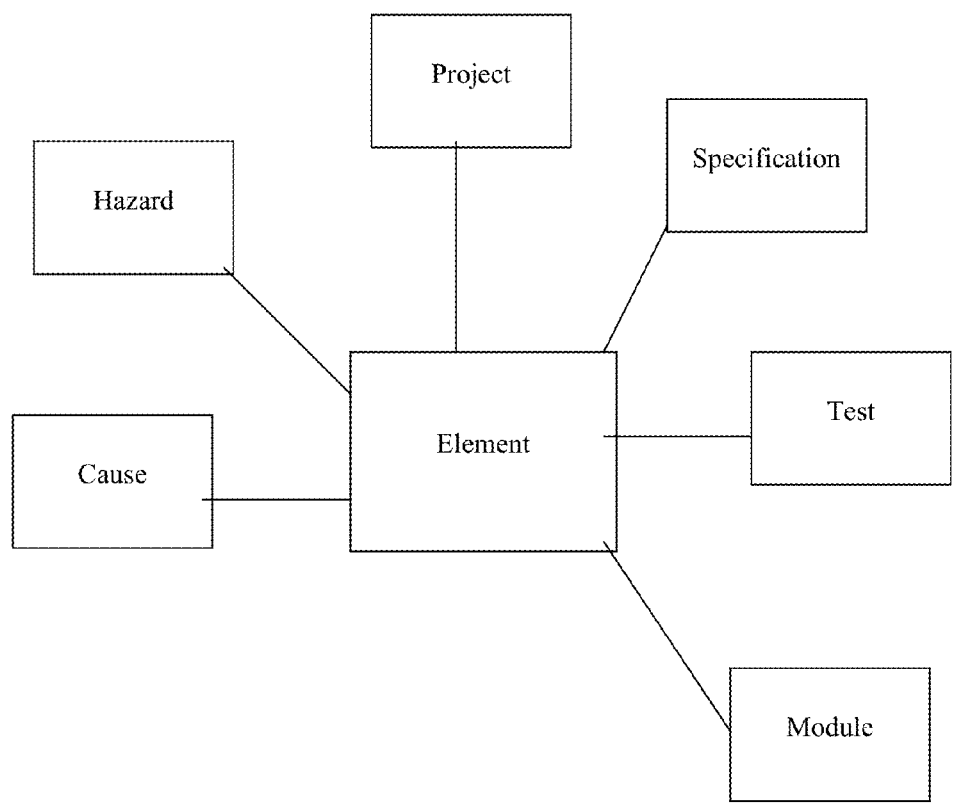
FIG. 2 a component overview of a software application for implementing the inventive method.

The method steps shown in FIG. 1 also serve to describe a hierarchy of elements used for designing a software application, in particular program, which is configured to execute the inventive method. For example, the element "hazard" is dependent on the elements "product" and "target specification" as well as "product specification" as shown by the arrows in FIG. 1. The same is valid for the other entities and method steps shown in FIG. 1 according to the direction of the arrows shown in FIG. 1. A corresponding object model class diagram is shown in FIG. 2 which merely illustrates an example of members of the class "elements". The inventive method of determining an analysing level is preferably implemented as a program written in an object-oriented programming language. For example, a specific hazard or a specific test as shown by the boxes depicted in FIG. 2 and associated with the box "element" (and in analogy for other boxes of FIG. 2 which surround the box "element"), may be described as an element in a data base which is accessed by the program. An element is a class which preferably incorporates the subclasses of at least "cause", "hazard", "project", "specification", "test", and "module". These class names are, in accordance with the above description, self-explanatory as to the parts of the inventive method which are described by them. Preferably, the class "element" comprises a list "children" and a set "parents" and attributes which describe the dependencies of "element" on functional modules or hazards or other members of the class "element". The attributes in particular comprise meta-information which describes for example the mode of execution of a test, in particular a temporal or functional order of tests or an absolute point in time of executing the test.

Figure 3:
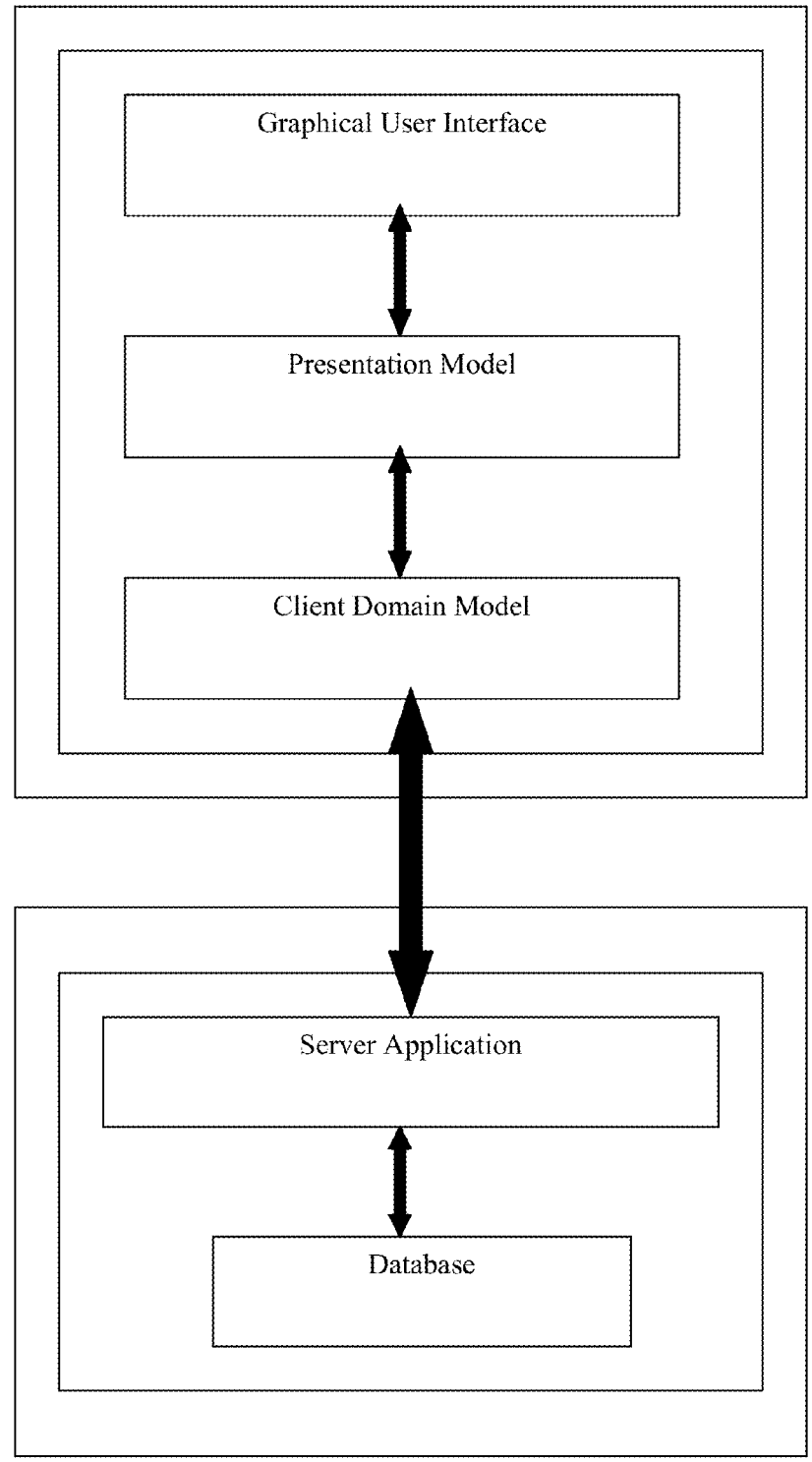
FIG. 3 a general layout of an IT-infrastructure used for implementing the inventive method.

FIG. 3 is a component overview of the software application for implementing the inventive method. A client application is run in a client domain model on a workstation, while a server application is run on a dedicated server or a virtual server. The server application runs in the server domain, part of which also is a database which comprises data containing information about the test procedure, documentation of tests and preferably also of changes to the test procedure and documentation as described above. The server application preferably hosts or contains a collator and/or a generator. The generator preferably is a software program configured to generate the documentation containing information about the system test procedure, and the collator is a software program preferably configured to collect information about changes in at least part of the system test procedure. Both the collator and the generator preferably run in the background in a server domain and poll the database for changes in regular intervals, or are triggered whenever a change to at least part of the system test procedure occurs. Thereby, a repository of intermediate results may be kept in files on disc, objects in memory or, as is especially preferred, as tables (so-called repository tables) in the database. The intermediate results preferably contain older versions of the test documentation or versions or results of at least part of the system test procedure which have been gathered up to the point at which a change has occurred. Preferably, the collator collects changes and applies them to the repository. According to the invention, it is possible to create a new text document comprising test documentation after each change. It is according to the invention also envisaged to combine changes by defining a stability criterion, e.g. a certain period of inactivity, before triggering the generator, which then in turn schedules the actual LaTeX run.

The client application preferably is a standalone client application. Alternatively, it may be implemented as a web interface. The client domain model essentially is a set of Java objects following the object model as described above. It represents the client domain objects with which the user deals and preferably has no knowledge about the graphical user interface which is used to illustrate the dependencies as described above. The database comprises tables, rows and SQL-based data comprising information about the dependencies and the system test procedure or its constituents. The server application in particular comprises makers for generating documentation after a change and provides communication with the client application which is operated by the user. The client application is contained in the client domain model which comprises elements and the attributes and relations in an object-oriented manner, wherein the elements in particular describe the modular system, the hazards and measures as well as at least in part the system test procedure. A presentation model comprises a graph manager and nodes and connectors which govern the graphical display of the modules and their dependencies. The graphical user interface comprises an application for graphical display as well as views and buttons and other means of control which may be operated by the user, in particular may be edited. Illustration of the graphical user interface is supported by the presentation model which in particular represents the state and behaviour of the presentation controls independently of the graphical user interface controls which are useable by means of the graphical user interface. Preferably, the presentation model follows the design by Martin Fowler and Karsten Lentzsch.

Figure 4:
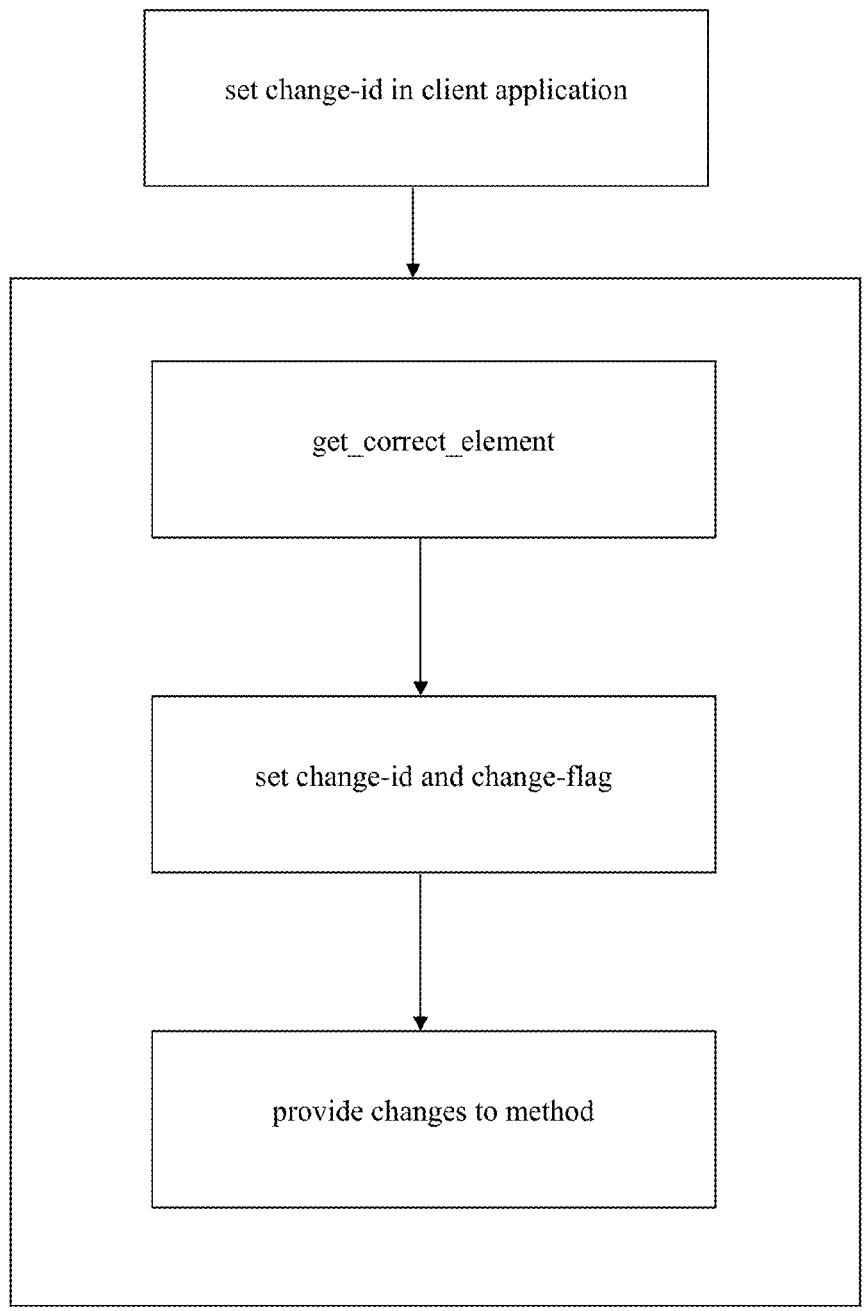
FIG. 4 an algorithm for tracking changes.

FIG. 4 is an algorithm for tracking changes in a test procedure, in particular changes corresponding to an element forming part of the test procedure. Every element or attribute of an element or relationship in the database has a change-id which provides information about the change which has last occurred with regard to the element, attribute or relationship. Before the lower box comprising methods related to saving changes is entered, a method "set change-id in client application" is executed. This method serves the purpose of creating time consistency between the server and the client. The change-id corresponds to a time stamp for the version of the system test procedure and thus supports differentiation between different versions (in particular, the original version and the changed version which was created by changing the original version). Everytime the database is polled, a method for getting the correct element ("get_correct_element") is executed. A change to the element is determined, for example by common string comparison, and documented with a change-flag. In order to guarantee traceability, information about a user who implemented the change may also be collected. The inventive method is also able to collect a plurality of changes and provide them to the subsequent method steps as one change in a change-set. The client application is provided with and/or acquires the change-id such that the status of changes may be consistently determined which helps to avoid unwanted overwriting of older versions which are stored on the server. The change-flag is preferably set in the metadata information describing or text information containing the test procedure.

Figure 5A:
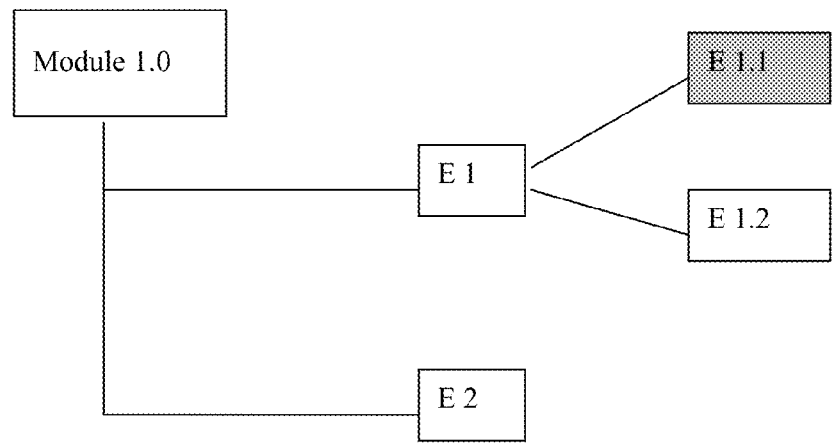
FIG. 5a a block diagram showing a first change to a sub-element contained in a first functional module.
Figure 5B:
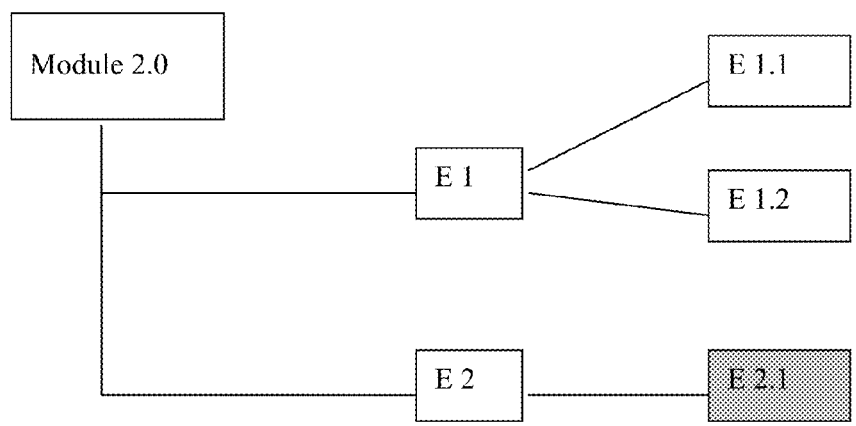
FIG. 5b a block diagram of a change to a sub-element contained in a second functional module.
Figures 5C, 5D:
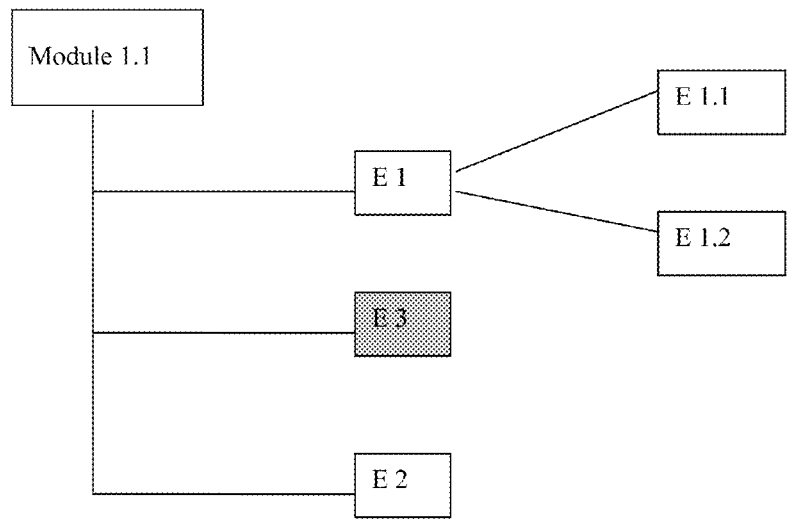
FIG. 5c a block diagram of branching-off the first functional module.
FIG. 5d an example of a repository table.

FIG. 5a is an example of a functional module 1.0 into which elements E1 and E2 are newly introduced. Elements E1 and E2 are examples of sub-modules of first order. Element E1 comprises sub-elements E1.1 and E1.2 which are examples of sub-modules of second order. An attribute to sub-element E1.1 is changed as indicated by the grey shading in FIG. 5. In other words, FIG. 5a shows a branch of the system test procedure for module 1.0. A branch corresponds to a virtual copy as described above. A branch is denoted by the name of the module "module" and the version ("1.0"— which denotes a "first-level" branch, in this case an original version). When part of the test procedure, in this case a part of the module test procedure for module 1.0 which relates to testing sub-element E1.1, is changed, a copy of the original version of the module test procedure for module 1.0 is created. In the following, the parts of the module test procedure are described in terms of the modules, elements or sub-elements, which they are designed to test. For example, instead of saying the module test procedure for module 1.0, the following description will call this simply module 1.0. The history of creating such copies (also called "branch history") and the dependencies between parts of each branch are created and saved in the database using the element-ID of the respective functional module and its elements. The branch history and the dependencies are kept in a so-called repository table which is shown in FIG. 5d. In order to avoid creation of excess data, the copying is limited to creating a virtual copy of the changed branch. That is, only the changed element and its relations are copied, preferably along with information indicating the relationship between the previous version (original version) and the changed version of the system test procedure, in particular the storage locations of changes and original version such as memory addresses in a non-volatile digital memory (i.e. the aforementioned change meta-information). All other elements, in particular the elements which have not been changed, are only copied as soon as they are actually changed. The virtual copy behaves as a new module and receives a new element ID, in the case of a change to module 1.0, the new module will be called module 1.1.

In the example of FIG. 5*a*, an attribute to sub-element E1.1 is changed. In the example of FIG. 5*b*, an attribute to sub-element E2.1 which forms the part of a second module 2.0 is changed. As is evident from FIGS. 5*a* and 5*b*, both first functional module 1.0 and second functional module 2.0 comprise elements E1 and E2 as well as the sub-elements E1.1 and E1.2. A change to sub-element E1.1 as shown in FIG. 5*a* in the context of module 1.0 therefore potentially influences the functionality of sub-element E1.1 in the context to module 2.0, in particular in co-operation of sub-element E1.1 with the other parts of module 2.0 such as for example element E2. However, the change to the attribute of element E2.1 as shown in FIG. 5*b* is not considered to influence a functionality of element E2 in the context of module 1.0 as shown in FIG. 5*a*, since module 1.0 does not comprise sub-element E2.1.

If now, for example, a virtual copy of module 1.0 is created and named module 1.1 as illustrated by FIG. 5*c*, then a new element E3 is introduced to module 1.1. The previous version module 1.0 as shown in FIG. 5*a* is preferably kept in the repository. A virtual copy then is generated for elements, in particular elements contained in module 1.0 which remain unchanged. The virtual copy is defined in particular by meta-information for the unchanged elements which describes their relation, in particular dependency with regard to the newly created module 1.1.

Traceability of changes as described above with regard to FIGS. 5*a* to 5*c* is supported by a repository table as shown in FIG. 5*d*. The repository table comprises metadata comprising information about the changes. Using the elements ID (column "ID"), the ID of the module containing an element (column "module") and the change ID (column "change"), it is thus possible to recreate the state of any element (and, consequently, module) at any point in the past, and, by extrapolation, the state of any complete document comprising documentation information about the system test procedure. Furthermore, the table shown in FIG. 5*d* comprises information about the relation of each element, wherein the elements are sorted in rows. The column "relation-module" denotes the name of the virtual copy as well as parents and children of the changed element. Parents and children denote the other constituents of the containing module which depend on the functionality of the changed element or on the functionality of which the functionality of the changed element depends, respectively.

The above-described way of producing virtual copies and providing traceability information provides in particular the advantage of being able to work simultaneously or at least overlapping in time on different versions of a product and/or system test procedure. This is furthermore supported by merging two or more virtual copies which originate from the same branch after changing all of the virtual copies has finished. Thereby, a complete new version of an original module can be provided while safeguarding traceability of changes and providing information on a necessity for re-testing which may both be extracted from the repository table as shown by the example of FIG. 5*d*.

Figure 6A:
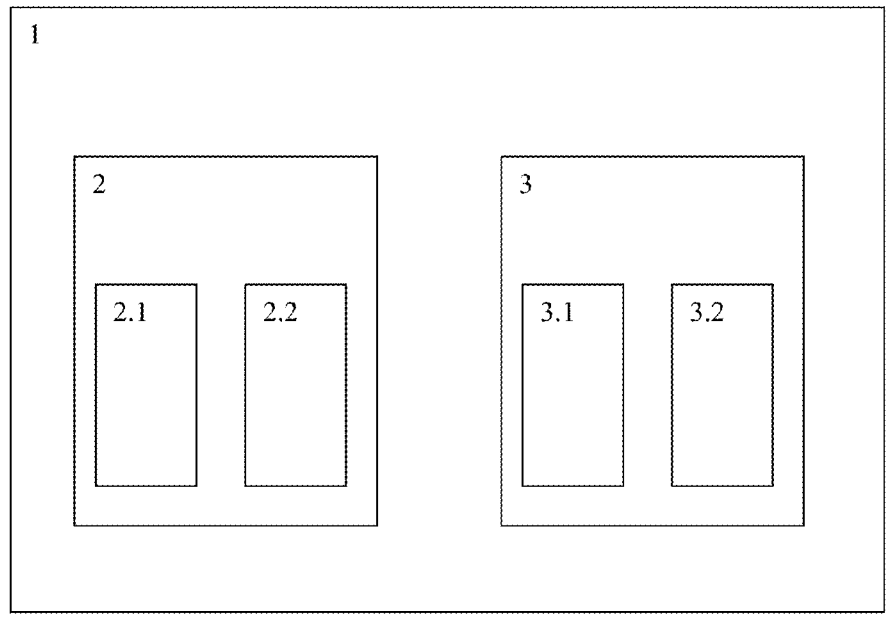
FIG. 6a a block diagram of a modular system before being changed.
Figure 6B:
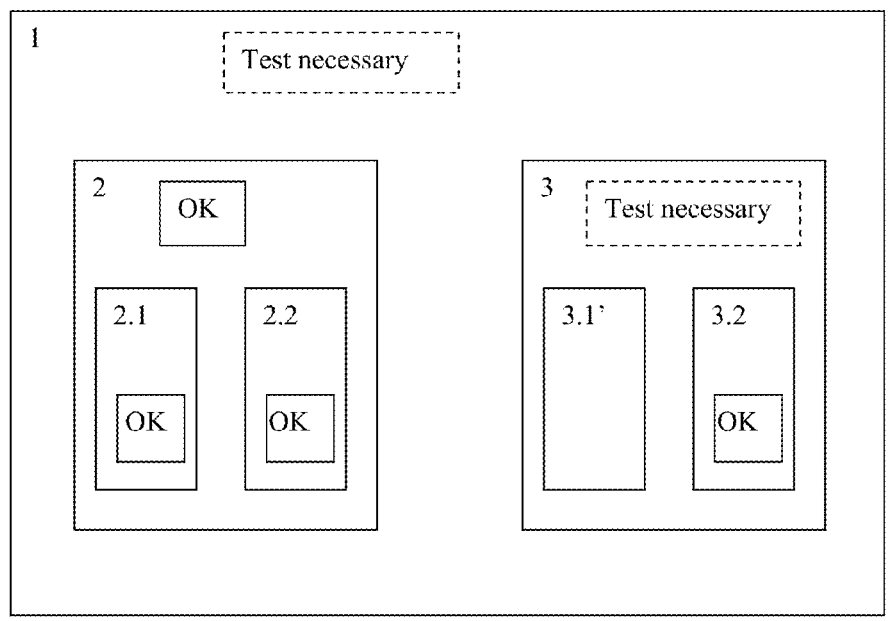
FIG. 6b a block diagram of the modular system after being changed.

In FIGS. 6*a* and 6*b*, a block diagram depicting a block diagram of a system test procedure for a radio therapy system 1 before (FIG. 6*a*) and after (FIG. 6*b*) a change has occurred. The system test procedure 1 for a radio therapy system comprises a module test procedure for a couch module 2 and a controlling module 3. The module test procedure for the couch module 2 comprises a sub-module test procedure for couch hardware 2.1 and a sub-module test procedure for couch firmware 2.2. The module test procedure for the control module 3 for controlling the hardware, which controlling module 3 comprises a sub-module test procedure for a controlling to the couch module 3.1 and another sub-module test procedure for another part of the controlling module such as for example a sub-module for an interface 3.2 to external software applications. The controlling module 3 is preferably implemented at least partly as software. In the following, the module test procedures and sub-module test procedures are also denoted by the name of the module which they are meant to test.

In FIG. 6*b*, the system test procedure for the radio therapy system 1 is shown as in FIG. 6*a* with the difference that the control link 3.1 has been changed to be the control link 3.1'. For example, a command to be executed by the control link 3.1 may have been altered or newly introduced into control link 3.1, thus creating control link 3.1'. As is implied by the block diagram, the radio therapy system 1 is dependent on the functionality of the couch 2 and the controlling module 3, wherein the couch 2 is independent of the functionality of the control link 3.1 and independent of the functionality of the controlling module 3. However, the functionality of the controlling module 3 is dependent on the functionality of the control link 3.1. Having changed control link 3.1 into control link 3.1', a re-testing of the radio therapy system 1 is necessary starting from the system level of control link 3.1' and carrying on further upward in the hierarchy of dependencies. Accordingly, the system test procedure has to be analyzed whether it still covers hazards and targets created or changed by the change to the control link 3.1. This analysis starts from the system level of control link sub-module 3.1' as an analyzing level and is conducted in accordance with the dependencies associated with control links 3.1' and control link 3.1. Since the other sub-module 3.2 is independent of the functionality of control link 3.1', the other sub-module 3.2 is marked with "OK" which means that it does not require re-testing after the change. However, re-testing of the controlling module 3 and the radio therapy system 1 is necessary. According to FIG. 6*b*, the couch module 2 and its sub-modules 2.1 and 2.2 do not require re-testing. Thereby, information is provided which other functional modules or sub-modules may be influenced by the change of the respective element and thus require re-testing of and/or adaptation of (i.e. further changes to) the system test procedure.

Figure 7:
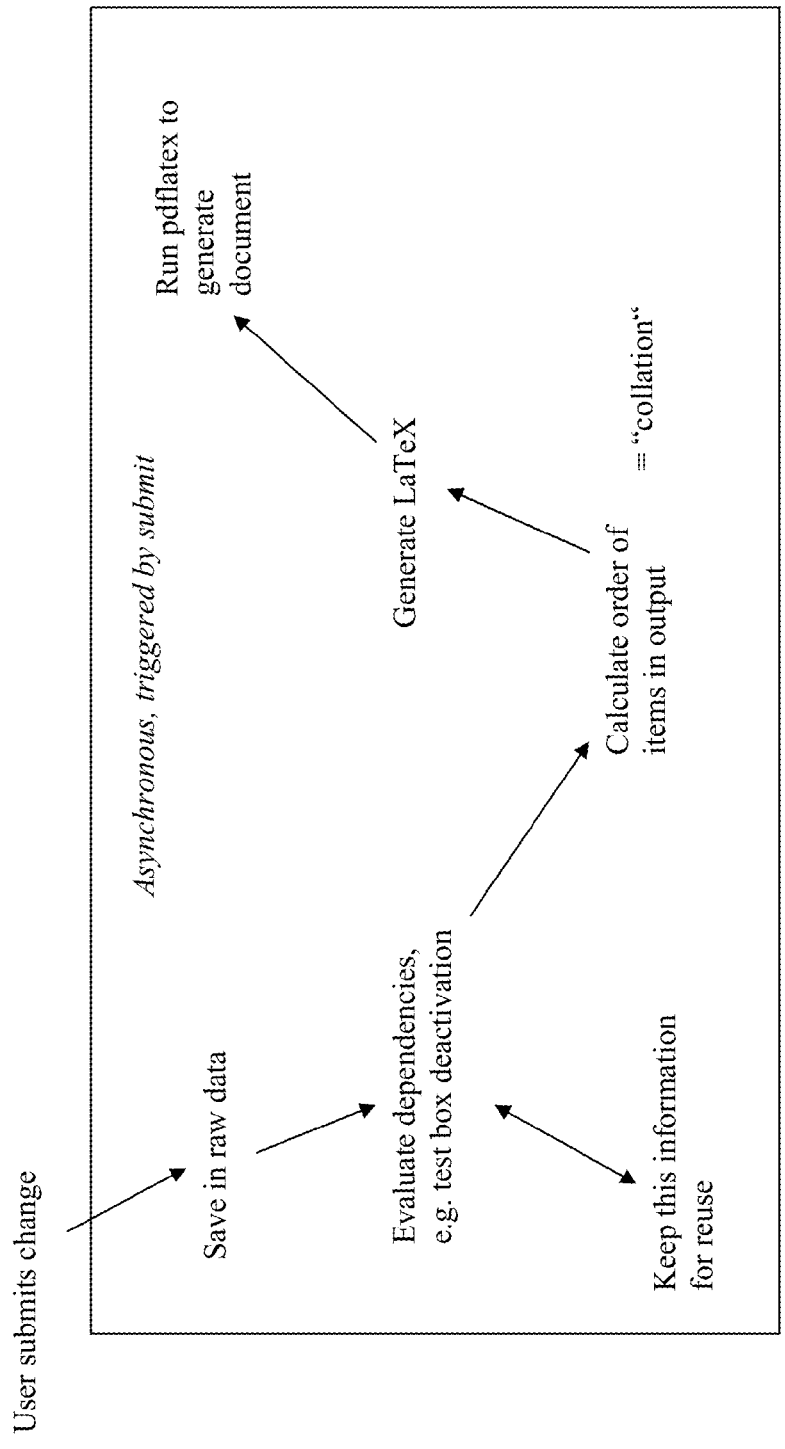
FIG. 7 a flow diagram for creating test documentation.

FIG. 7 describes the operation of the collator: Once a user submits a change in the system test procedure or a part of the system test procedure to the database, the change is saved in raw data and the submit command issued by the user triggers an evaluation of dependencies of modules and/or sub-modules on one another. The information resulting from the evaluation of dependencies, i.e. information about the existence or non-existence of dependencies of modules upon one another is saved and kept for re-use on the occasion of future changes. The method then continues with calculating the order of items in output, i.e. with determining the order of steps of the system test procedure in the order in which they are to be written in the documentation. This step is also denoted as "collation". Subsequently, LaTeX-code is generated for the documentation and an document containing the documentation is generated by running PDF LaTeX.

The invention claimed is:

1. A method of determining an analyzing level for analyzing a system test procedure for testing a modular system having functional modules, comprising:
   a) acquiring dependency data comprising dependency information describing at least one functional dependency of at least one functional module;

b) acquiring change data comprising change information describing a change in a module test procedure for testing at least part of the at least one functional module located at a first system test level;

c) acquiring impact data comprising impact information describing an impact of the change in the module test procedure on testing a functionality of the at least one functional module based on the dependency information and the change information;

d) determining, based on the impact information, analyzing level data comprising analyzing level information describing an analyzing level being the system test level at which the system test procedure is analyzed.

2. The method according to claim 1, wherein the analyzing level is determined if it is determined that the change in the module test procedure impacts a functionality of the at least one functional module.

3. The method according to claim 1, wherein analyzing the system test procedure comprises determining, as a risk-decrease level, the functional level at which a risk-decreasing measure has to be implemented for decreasing a risk resulting from the change in the module test procedure.

4. The method according to claim 3, wherein the risk-decreasing measure is implemented.

5. The method according to claim 4, comprising producing digital or hardcopy documentation containing information about the system test procedure.

6. The method according to claim 5, comprising determining whether the documentation complies with a predetermined standard.

7. The method according to claim 6, wherein the predetermined standard is a legal or technical requirement.

8. The method according to claim 3, wherein the risk is a health risk or a technical risk.

9. The method according to claim 1, wherein
the change information describes a change in a module test procedure for testing at least part of a first functional module located at a first system test level,
the impact information describes an impact of the change in the module test procedure on testing a functionality of a second functional module based on the dependency information and the change information.

10. The method according to claim 9, wherein a module test procedure for testing the second functional module is not executed if it is determined that the first and the second functional module have a predetermined mode of interaction.

11. The method according to claim 9, wherein a risk-decreasing measure is not implemented in the second or a third functional module if it is determined that the first and the second functional module have a predetermined mode of interaction.

12. The method according to claim 9, wherein the analyzing level is determined if the change in the modular test procedure impacts the technical relation of the first and second functional modules.

13. The method according to claim 9, wherein the second functional module is located at the first system level.

14. The method according to claim 1, wherein the analyzing level is located at the first system test level or at a higher system test level located above the first system test level.

15. The method according to claim 1, wherein the modular system is or comprises a hardware device, in particular a medical device, or a software product, in particular an executable application.

16. The method according to claim 1, comprising changing the module test procedure for testing the at least part of the at least one functional module.

17. The method according to claim 1, wherein the at least one functional module is a software module and the second functional module is a hardware module.

18. The method according to claim 1, wherein the at least one functional dependency is visualized in a tree diagram or a net-like diagram.

19. The method according to claim 1, wherein the system test procedure comprises testing the operability or the safeness of operation of the modular system and the modular test procedure comprises testing the operability or the safeness of operation of a functional module.

20. The method according to claim 1, wherein the change in the module test procedure comprises a text amendment in a digital or hardcopy specification of the module test procedure.

21. The method according to claim 1, wherein information about at least one difference between versions of the system test procedure, in particular the change information, is saved.

22. A computer program embodied on a non-transitory computer readable medium which, when running on a computer or when loaded onto a computer, causes the computer to perform the steps a) acquiring dependency data comprising dependency information describing at least one functional dependency of at least one functional module;

b) acquiring change data comprising change information describing a change in a module test procedure for testing at least part of the at least one functional module located at a first system test level;

c) acquiring impact data comprising impact information describing an impact of the change in the module test procedure on testing a functionality of the at least one functional module based on the dependency information and the change information; and d) determining, based on the impact information, analyzing level data comprising analyzing level information describing an analyzing level being the system test level at which the system test procedure is analyzed.

23. A digital data processing system for tracking changes in a system test procedure for testing a modular system having at least one functional module, comprising:

a) a test procedure database comprising system test procedure data comprising system test information describing at least part of the system test procedure;

b) a dependency model unit comprising dependency data comprising dependency information describing at least one functional dependency of at least one functional module;

c) a dependency model presentation unit for displaying the at least one functional dependency;

d) a server for running a surveillance server application comprising code means for checking the test procedure database for changes in the system test information;

e) a data storage unit for storing the system test at least part of the procedure data if the surveillance server application determines that the system test information is being or has been changed.

24. The system according to claim 23, comprising a graphical user interface unit for controlling the at least one functional dependency.

25. The system according to claim 23, wherein the data storage unit is configured to store data comprising information about at least one difference between versions of the system test information, in particular a change to the at least one functional dependency.

26. The system according to claim 25, wherein the data storage unit is configured to store only the data comprising information about the at least one difference if the surveillance server application determines that the system test information is being or has been changed.

* * * * *